(12) United States Patent
Yang et al.

(10) Patent No.: US 11,743,902 B2
(45) Date of Patent: Aug. 29, 2023

(54) INFORMATION TRANSMISSION METHOD AND APPARATUS

(71) Applicant: ZTE Corporation, Shenzhen (CN)

(72) Inventors: Weiwei Yang, Shenzhen (CN); Bo Dai, Shenzhen (CN); Xianming Chen, Shenzhen (CN); Kun Liu, Shenzhen (CN); Huiying Fang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 113 days.

(21) Appl. No.: 16/638,338

(22) PCT Filed: Aug. 13, 2018

(86) PCT No.: PCT/CN2018/100228
§ 371 (c)(1),
(2) Date: Apr. 8, 2020

(87) PCT Pub. No.: WO2019/029746
PCT Pub. Date: Feb. 14, 2019

(65) Prior Publication Data
US 2020/0396723 A1    Dec. 17, 2020

(30) Foreign Application Priority Data

Aug. 11, 2017 (CN) .......................... 201710687653.5

(51) Int. Cl.
*H04W 72/23* (2023.01)
*H04W 4/70* (2018.01)
(Continued)

(52) U.S. Cl.
CPC .......... *H04W 72/23* (2023.01); *H04L 5/0007* (2013.01); *H04L 27/2605* (2013.01); *H04W 4/70* (2018.02);
(Continued)

(58) Field of Classification Search
CPC ..... H04W 72/042; H04W 4/70; H04W 76/28; H04W 52/0225; H04W 68/005;
(Continued)

(56) References Cited

U.S. PATENT DOCUMENTS 9,686,783 B1    6/2017  Patel
2009/0116459 A1*  5/2009  Do .................. H04W 8/005
370/336

(Continued)

FOREIGN PATENT DOCUMENTS

CN      102858014 A    1/2013
CN      104244417 A    12/2014
(Continued)

OTHER PUBLICATIONS

3GPP TS 36.304, Evolved Universal Terrestrial Radio Access, User Equipment (UE) procedures in idle mode, Jun. 23, 2017, vol. RAN WG2, No. V14.3.0, Jun. 23, 2017, pp. 1-49, XP051299013.
(Continued)

*Primary Examiner* — Sharmin Chowdhury
(74) *Attorney, Agent, or Firm* — CANTOR COLBURN LLP (57) ABSTRACT

Provided are an information transmission method and apparatus, the method includes: receiving, by a terminal, a signal sent by a base station at a preset first time-frequency position; and detecting the signal, and determining whether to detect a physical downlink channel according to a detection result for the signal.

17 Claims, 2 Drawing Sheets

A terminal receives, at a preset first time-frequency position, a signal sent by a base station — S202

The terminal detects the signal, and determines whether to detect a physical downlink channel according to a detection result for the signal — S204

(51) Int. Cl.
  *H04W 76/28* (2018.01)
  *H04L 5/00* (2006.01)
  *H04L 27/26* (2006.01)
  *H04W 52/02* (2009.01)
  *H04W 68/00* (2009.01)
  *H04W 72/044* (2023.01)

(52) U.S. Cl.
  CPC ..... *H04W 52/0225* (2013.01); *H04W 68/005* (2013.01); *H04W 76/28* (2018.02); *H04W 72/044* (2013.01)

(58) Field of Classification Search
  CPC ... H04W 72/044; H04W 24/00; H04W 52/02; H04W 68/00; H04L 5/0007; H04L 27/2605; H04L 5/00; H04L 27/26; H04L 5/0053; H04L 27/2601; H04B 17/30
  See application file for complete search history.

(56) References Cited

U.S. PATENT DOCUMENTS

| | | | |
|---|---|---|---|
| 2018/0270756 A1* | 9/2018 | Bhattad | H04W 52/0216 |
| 2020/0029302 A1* | 1/2020 | Cox | H04W 52/0235 |
| 2021/0007053 A1* | 1/2021 | Jiang | H04W 52/0293 |
| 2021/0153163 A1* | 5/2021 | Hwang | H04W 68/02 |

FOREIGN PATENT DOCUMENTS

| | | |
|---|---|---|
| CN | 104469804 A | 3/2015 |
| CN | 104754603 A | 7/2015 |
| CN | 105743626 A | 7/2016 |
| CN | 106489246 A | 3/2017 |
| WO | 2014047821 A1 | 4/2014 |
| WO | 2017052596 A1 | 3/2017 |

OTHER PUBLICATIONS

Chinese Office Action for corresponding application 201710687653.5; Report dated Mar. 1, 2021.
European Search Report for corresponding EP18 84 5149; Report dated Apr. 7, 2021.
Huawei, Hisilicon, "On wake-up signal for paging and connected-mode DRX", 3GPP TSG RAN WG1 Meeting #89, China May 2017, R1-1707021.
Nokia, Alcatel-Lucemt Shanghai Bell, "Signalling for Efficient Decoding of Physical Channels", 3GPP TSG RAN WG1 Meeting #89, Hangzhou, May 2017, R1-1708072.
Sony, "Power Consumption Evaluation of wake-up signal technique for feMBIoT", 3GPP TSG RAN WG1 Meeting #89, May 2017, R1-1708247.
ZTE, 3GPP TSG-RAN WG2 Meeting, Croatia, "Remaining Issues for Paging in NB-IoT", Apr. 2016, R2-162359.
International Search Report for corresponding application PCT/CN2018/100228 filed Aug. 13, 2018; dated Oct. 2018.

* cited by examiner

INFORMATION TRANSMISSION METHOD AND APPARATUS

CROSS-REFERENCES TO RELATED APPLICATIONS

This is a National Stage Application, filed under 35 U.S.C. 371, of International Patent Application No. PCT/CN2018/100228, filed on Aug. 13, 2018, which claims priority to a Chinese patent application No. 201710687653.5 filed on Aug. 11, 2017, disclosure of which is incorporated herein by reference in its entirety.

TECHNICAL FIELD

The present application relates to communications and, for example, to an information transmission method and apparatus.

BACKGROUND

In the related art, Machine Type Communications (MTC), also referred to as Machine to Machine (M2M), is the primary application form of the Internet of Things in the current stage. Currently, MTC devices deployed on the market are mainly based on the global system of mobile communication (GSM). In recent years, more and more mobile operators have chosen Long Term Evolution (LTE)/LTE-Advanced (LTE-A) as the evolution direction of the future broadband wireless communication system due to the high spectral efficiency of the LTE/LTE-A. Various MTC data services based on the LTE/LTE-A will also be more attractive.

Several technologies applicable to the Comb-Internet Of Things (C-IoT) technology have been disclosed in the technical report TR45.820V200 of the 3rd generation partnership project (3GPP), among which the Narrow Band-Internet Of Things (NB-IOT) technology is the most striking technology. The NB-IoT system focuses on radio frequency (RF) access technologies with low complexity and low throughput, and the main research objects include: indoor coverage improvement, support for a massive number of user equipments with low throughput, low delay sensitivity, ultra-low equipment costs, low equipment power consumption and network architecture.

The network can send paging to user equipment (UE) in an idle state or the UE in a connected state. The paging process may be triggered by a core network for instructing a certain UE to receive a paging request, or may also be triggered by an enhanced Node B (eNB) for notifying update of system information. The paging message is scheduled by using a Physical Downlink Control Channel (PDCCH) scrambled by a P-Radio Network Temporary Identifier (RNTI), and is transmitted in a Physical Downlink Shared Channel (PDSCH).

In an NB-IoT or a MTC system in the related art, a process of a terminal obtaining a paging message is that: the terminal detects a corresponding PDCCH at a paging occasion (PO) to determine whether the PDSCH indicated by the PDCCH carries a paging message or a system message change indication corresponding to the terminal, but if the terminal does not detect the corresponding PDCCH at the PO, it indicates that there is no paging message corresponding to the terminal at the PO, and then the terminal detects the PDCCH at a next PO.

The Machine Type Communications Physical Downlink Control Channel (MPDCCH) or the Narrowband Physical Downlink Control Channel (NPDCCH) is carried in the PDSCH, that is, only after receiving a complete subframe, the terminal may determine whether a corresponding MPDCCH is detected.

The detection process of the PDCCH is that: the terminal attempts to detect the PDCCH according to all downlink control information formats, and if the PDCCH is not detected, the terminal continues to attempt the detection on a next sub-frame until the PDCCH is detected. No efficient solution has been provided to solve the problems in the related art of excessive times of detecting the physical downlink channel by the terminal and increased power consumption of the terminal.

SUMMARY

The following is a summary of the subject matter described herein in detail. This summary is not intended to limit the scope of the claims.

Embodiments of the present application provide an information transmission method and apparatus to avoid the problems in the related art of excessive times of detecting the physical downlink channel by the terminal and increased power consumption of the terminal.

According to an embodiment of the present application, a signal transmission method is provided. The method includes: receiving at a preset first time-frequency position, by a terminal, a signal sent by a base station; and detecting, by the terminal, the signal, and determining whether to detect a physical downlink channel according to a detection result for the signal.

According to another embodiment of the present application, a signal transmission method is further provided. The method includes: sending, by a base station, a signal at a preset first time-frequency position; and determining, by the base station, whether to send a physical downlink channel according to the signal.

According to another embodiment of the present application, a signal transmission apparatus is provided. The apparatus includes: a receiving module, which is configured to receive, at a preset first time-frequency position, a signal sent by a base station; and a detecting module, which is configured to detect the signal, and determine whether to detect a physical downlink channel according to a detection result for the signal.

According to another embodiment of the present application, a signal transmission apparatus is further provided. The apparatus includes: a sending module, which is configured to send a signal at a preset first time-frequency position; and a determining module, which is configured to determine whether to send a physical downlink channel according to the signal.

According to another embodiment of the present application, a storage medium is provided. The storage medium includes stored programs which, when executed, perform the method of the embodiments described above.

According to another embodiment of the present application, a processor is further provided.

The processor is configured to execute programs which, when executed, perform the method of the embodiments described above.

Other aspects can be understood after the drawings and the detailed description are read and understood.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings.

DETAILED DESCRIPTION

An embodiment of the present application provides a mobile communication network (which includes, but is not limited to a 5th generation (5G) mobile communication network). The network architecture of this network may include a network side device (such as a base station) and a terminal. An information transmission method executable on the above network architecture is provided in the embodiment. It is to be noted that an execution environment of the above information transmission method provided by the embodiment of the present application is not limited to the above network architecture.

Embodiment One

Figure 1:
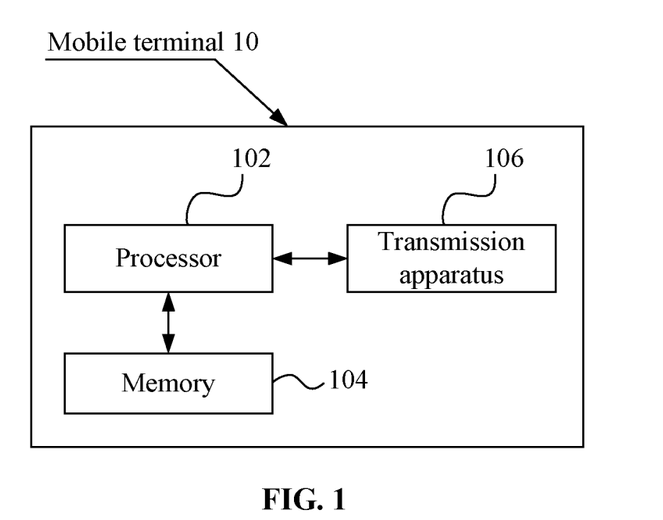
FIG. 1 is a block diagram of a hardware structure of a mobile terminal for a signal transmission method according to an embodiment of the present application.

A method embodiment provided by the embodiment one of the present application may be executed in a mobile terminal, a computer terminal or other similar computing apparatuses. Taking the method to be executed in the mobile terminal as an example, FIG. 1 is a block diagram of a hardware structure of a mobile terminal for a signal transmission method according to an embodiment of the present application. As shown in FIG. 1, a mobile terminal 10 may include one or more (only one is shown in FIG. 1) processors 102 (the processor 102 may include, but is not limited to, a processing device such as a microcontroller unit (MCU) and a field programmable gate array (FPGA)), a memory 104 used for storing data, and a transmission apparatus 106 used for implementing a communication function. It should be understood by those skilled in the art that the structure shown in FIG. 1 is merely illustrative, and not intended to limit the structure of the electronic apparatus described above. For example, the mobile terminal 10 may further include more or fewer components than the components shown in FIG. 1, or may have a configuration different from the configuration shown in FIG. 1.

The memory 104 may be configured to store software programs and modules of application software, such as program instructions/modules corresponding to the signal transmission method in the embodiments of the present application. The processors 102 execute the software programs and modules stored in the memory 104 to perform functional applications and data processing, that is, the method described above is implemented. The memory 104 may include a high-speed random access memory, or may further include a nonvolatile memory such as one or more magnetic storage apparatuses, flash memories or other nonvolatile solid-state memories. In some examples, the memory 104 may further include memories that are remotely disposed with respect to the processors 102. These remote memories may be connected to the mobile terminal 10 via a network. Examples of the above network include, but are not limited to, the Internet, an intranet, a local area network, a mobile communication network and a combination thereof.

The transmission apparatus 106 is configured to receive or transmit data via a network. Specific examples of such a network may include a radio network provided by a communication provider of the mobile terminal 10. In one embodiment, the transmission apparatus 106 includes a network interface controller (NIC), which may be connected to other network equipment via a base station and thus be capable of communicating with the Internet. In one example, the transmission apparatus 106 may be a radio frequency (RF) module, which is configured to communicate with the Internet in a wireless way.

Figure 2:
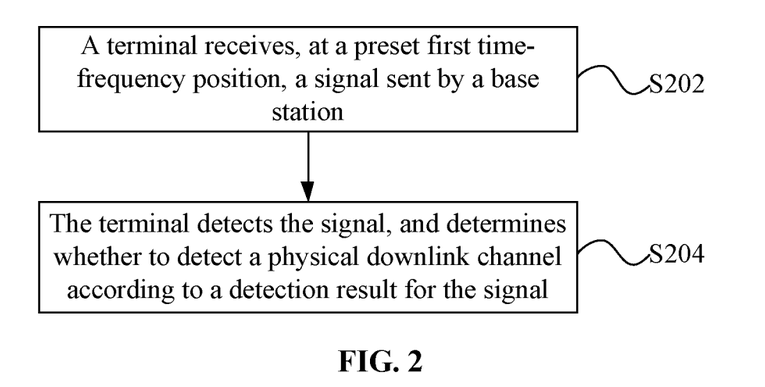
FIG. 2 is a flowchart of a signal transmission method according to an embodiment of the present application.

This embodiment provides a signal transmission method executed in the mobile terminal described above. FIG. 2 is a flowchart of a signal transmission method according to an embodiment of the present application. As shown in FIG. 2, the method includes the steps S202 and S204 described below.

In step S202, a terminal receives, at a preset first time-frequency position, a signal sent by a base station.

In step S204, the terminal detects the signal, and determines whether to detect a physical downlink channel according to a detection result for the signal.

Through the above steps, a terminal receives a signal sent by a base station at a preset first time-frequency position, detects the signal, and determines whether to detect a physical downlink channel according to a detection result for the signal. In other words, the terminal determines whether to detect the physical downlink channel according to whether a detection result of the detected signal meets a pre-agreed rule. By adopting the above solution, the problems in the related art of excessive times of detecting the physical downlink channel by the terminal and increased power consumption of the terminal can be avoided, and terminal power consumption can also be greatly reduced.

In one embodiment, the above steps may, but are not limited to, be executed by the terminal.

It is to be added that the physical downlink channel described above may include a PDCCH, and the PDCCH is a physical downlink control channel carting downlink control information.

In one embodiment, the step of determining whether to detect the physical downlink channel according to the detection result for the signal includes operations as follows: the terminal detects the physical downlink channel in condition that the signal is determined to be a first signal by the terminal; and the terminal does not detect the physical downlink channel in condition that the signal is determined to be a second signal by the terminal.

In one embodiment, the step that the terminal detects the signal includes operations as follows: the terminal detects the signal according to a connection mode configured by the base station; where in condition that the terminal is in a first connection mode, when the signal is determined to be a third signal, the terminal detects the physical downlink channel, and when the signal is determined to be a fourth signal, the terminal does not detect the physical downlink channel; or in condition that the terminal is in a second connection mode, when the signal is determined to be a fifth signal, the terminal detects the physical downlink channel, and when the signal is determined to be a sixth signal, the terminal does not detect the physical downlink channel.

In one embodiment, the step that the terminal detects the signal includes operations as follows: the terminal detects the signal according to a connection mode configured by the base station; where in condition that the terminal is in the first connection mode, the terminal detects the physical downlink channel only when the signal is detected to be a seventh signal; or in condition that the terminal is in the second connection mode, the terminal detects the physical downlink channel only when the signal is detected to be an eighth signal.

In one embodiment, a frequency domain position of the first time-frequency position contains a narrowband where the signal is located. The narrowband is a paging narrowband (PNB), or a narrowband where the PDCCH is located.

In one embodiment, a frequency domain position of the first time-frequency position contains a resource block where the signal is located. The resource block is a resource block determined according to a terminal index in the narrowband, a resource block where paging is located, or a resource block where the PDCCH is located.

In one embodiment, a frequency domain position of the first time-frequency position contains a subframe where the signal is located. The subframe is determined according to at least one of: a starting position of a PDCCH search space, a discontinuous reception (DRX) starting position or an extended DRX (eDRX) starting position, a first offset, or the number of repetitions of the signal; where the first offset is configured via high-layer signaling or is preset, and the number of repetitions of the signal is configured via high-layer signaling.

In one embodiment, an orthogonal frequency division multiplexing (OFDM) symbol where the signal contained at a time domain position in the preset first time-frequency position is located is one of: at least one of a second OFDM symbol and a third OFDM symbol in the subframe under conventional coverage; or symbols in the subframe from an m1-th OFDM symbol to an end of the subframe under coverage enhancement; or symbols in the subframe from an m2-th OFDM symbol to an end of the subframe. Where the first time domain position is a time domain position in the first time-frequency position, and m1 and m2 are positive integers greater than or equal to 0.

In one embodiment, a Zadoff-Chu (ZC) sequence corresponds to the signal, where a root sequence index of the ZC sequence is determined according to a cell index; or a ZC sequence and a pseudo-noise (PN) sequence correspond to the signal, where the root sequence index of the ZC sequence is determined according to a cell index and an initial value of the PN sequence is determined according to a terminal index, where a length of a sequence is determined according to at least one of: the number of sub-carriers in a frequency domain occupied by the signal, or the number of OFDM symbols in a time domain occupied by the signal. The length of the sequence refers to a length of a sequence corresponding to the signal. If the sequence corresponding to the signal is a ZC sequence, the length of the sequence refers to a length of the ZC sequence, but if the sequence corresponding to the signal is a ZC sequence and a PN sequence, the length of the sequence refers to a length of both the ZC sequence and the PN sequence.

In one embodiment, a cyclic shift index of the ZC sequence is determined according to a cyclic shift index 1 corresponding to the first signal, and a cyclic shift index of the ZC sequence is determined according to a cyclic shift index 2 corresponding to the second signal; where the cyclic shift index 1 and the cyclic shift index 2 are pre-determined values, or are cyclic shift indexes having a maximum cyclic shift spacing between the cyclic shift indexes.

In one embodiment, when the terminal is in the first connection mode, a cyclic shift index of the ZC sequence is determined according to a cyclic shift index 3 corresponding to the third signal, and a cyclic shift index of the ZC sequence is determined according to a cyclic shift index 4 corresponding to the fourth signal; when the terminal is in the second connection mode, a cyclic shift index of the ZC sequence is determined according to a cyclic shift index 5 corresponding to the fifth signal, and a cyclic shift index of the ZC sequence is determined according to a cyclic shift index 6 corresponding to the sixth signal; where the cyclic shift index 3, the cyclic shift index 4, the cyclic shift index 5 and the cyclic shift index 6 are pre-determined values, or satisfy that each two of the cyclic shift index 3, the cyclic shift index 4, the cyclic shift index 5 and the cyclic shift index 6 have a maximum cyclic shift spacing between the each two of the cyclic shift index 3, the cyclic shift index 4, the cyclic shift index 5 and the cyclic shift index 6. It is to be added that four cyclic shift indexes having maximum cyclic shift spacing therebetween may be selected as the cyclic shift index 3, the cyclic shift index 4, the cyclic shift index 5 and the cyclic shift index 6. In a similar way, the above selection manner may also be adopted when two cyclic shift indexes need to be selected.

In one embodiment, when the terminal is in the first connection mode, a cyclic shift index of the ZC sequence is determined according to a cyclic shift index 7 corresponding to the seventh signal; when the terminal is in the second connection mode, a cyclic shift index of the ZC sequence is determined according to a cyclic shift index 8 corresponding to the eighth signal; where the cyclic shift index 7 and the cyclic shift index 8 are pre-determined values, or are cyclic shift indexes having maximum cyclic shift spacing therebetween.

According to another embodiment of the present application, a signal transmission method is further provided. The method includes steps one and two described below.

In step one, a base station sends a signal at a preset first time-frequency position.

In step two, the base station determines whether to send a physical downlink channel according to the signal.

In one embodiment, the step that the base station determines whether to send the physical downlink channel according to the signal includes operations as follows: when the signal is a first signal, the base station sends a physical downlink channel corresponding to the signal; and when the signal is a second signal, the base station does not send a physical downlink channel corresponding to the signal.

In one embodiment, the step that the base station sends the signal at the preset first time-frequency position includes operations as follows: the base station sends the signal according to a connection mode of the terminal; where in condition that the terminal is in a first connection mode, when the signal sent by the base station is a third signal, the base station sends the corresponding physical downlink channel, and when the signal sent by the base station is a fourth signal, the base station does not send the physical downlink channel; or in condition that the terminal is in a second connection mode, when the signal sent by the base station is a fifth signal, the base station sends the corresponding physical downlink channel, and when the signal sent by the base station is a sixth signal, the base station does not send the physical downlink channel.

In one embodiment, the step that the base station sends the signal at the preset first time-frequency position includes operations as follows: the base station sends the signal according to the connection mode of the terminal; where in condition that the terminal is in a first connection mode, the base station sends the corresponding physical downlink channel only when the signal sent by the base station is a seventh signal; or in condition that the terminal is in a second connection mode, the base station sends the corresponding physical downlink channel only when the signal sent by the base station is an eighth signal.

In one embodiment, a first frequency domain position contains a narrowband where the signal is located. The narrowband is a PNB, or a narrowband where the PDCCH is located. The first frequency domain position is a frequency domain position of the first time-frequency position.

In one embodiment, the first frequency domain position contains a resource block where the signal is located. The resource block is one of: a resource block determined according to a terminal index in the narrowband, a resource block where paging is located, or a resource block where the PDCCH is located. The first frequency domain position is a frequency domain position of the first time-frequency position.

In one embodiment, the first frequency domain position contains a subframe where the signal is located. The subframe is determined according to at least one of: a starting position of a PDCCH search space, a DRX starting position or an eDRX starting position, a first offset, or the number of repetitions of the signal; where the first offset is configured via high-layer signaling or is preset, and the number of repetitions of the signal is configured via high-layer signaling. The first time domain position is a time domain position in the first time-frequency position.

In one embodiment, the preset first frequency domain position contains an OFDM symbol where the signal is located. The OFDM symbol is one of: under conventional coverage, at least one of a second OFDM symbol and a third OFDM symbol in the subframe; or under coverage enhancement, symbols in the subframe from an m1-th OFDM symbol to an end of the subframe, or symbols in the subframe from an m2-th OFDM symbol to an end of the subframe; where the first time domain position is a time domain position in the first time-frequency position, and m1 and m2 are positive integers greater than or equal to 0.

In one embodiment, a ZC sequence corresponds to the signal, where a root sequence index of the ZC sequence is determined according to a cell index; or a ZC sequence and a PN sequence correspond to the signal, where the root sequence index of the ZC sequence is determined according to a cell index and an initial value of the PN sequence is determined according to a terminal index; where a length of a sequence is determined according to at least one of: the number of sub-carriers in a frequency domain occupied by the signal, or the number of OFDM symbols in a time domain occupied by the signal.

In one embodiment, the terminal determines a cyclic shift index of the ZC sequence according to a cyclic shift index 1 corresponding to the first signal, and determines a cyclic shift index of the ZC sequence according to a cyclic shift index 2 corresponding to the second signal; where the cyclic shift index 1 and the cyclic shift index 2 are pre-determined values, or are cyclic shift indexes having a maximum cyclic shift spacing between the cyclic shift indexes.

In one embodiment, when the terminal is in the first connection mode, the terminal determines a cyclic shift index of the ZC sequence according to a cyclic shift index 3 corresponding to the third signal, and determines a cyclic shift index of the ZC sequence according to a cyclic shift index 4 corresponding to the fourth signal; when the terminal is in the second connection mode, the terminal determines a cyclic shift index of the ZC sequence according to a cyclic shift index 5 corresponding to the fifth signal, and determines a cyclic shift index of the ZC sequence according to a cyclic shift index 6 corresponding to the sixth signal; where the cyclic shift index 3, the cyclic shift index 4, the cyclic shift index 5 and the cyclic shift index 6 are pre-determined values, or are cyclic shift indexes having maximum cyclic shift spacing therebetween. It is to be added that four cyclic shift indexes having maximum cyclic shift spacing therebetween may be selected as the cyclic shift index 3, the cyclic shift index 4, the cyclic shift index 5 and the cyclic shift index 6. In a similar way, the above selection manner may also be adopted when two cyclic shift indexes need to be selected.

In one embodiment, when the terminal is in the first connection mode, the terminal determines a cyclic shift index of the ZC sequence according to a cyclic shift index 7 corresponding to the seventh signal; when the terminal is in the second connection mode, the terminal determines a cyclic shift index of the ZC sequence according to a cyclic shift index 8 corresponding to the eighth signal; where the cyclic shift index 7 and the cyclic shift index 8 are pre-determined values, or are cyclic shift indexes having maximum cyclic shift spacing therebetween.

In one embodiment, the first connection mode is a radio resource control (RRC) idle mode, and the second connection mode is an RRC connected mode.

The present application is described below in detail in conjunction with embodiments.

Exemplary Embodiment One

The signal transmission method in the exemplary embodiment one includes steps 1 and 2 described below.

In step 1, a terminal receives a signal sent by a base station at a first time-frequency position.

In step 2, the terminal determines whether to detect a physical downlink channel according to a detection result for the signal.

Exemplary Embodiment 1a

The signal transmission method in the exemplary embodiment 1a includes steps 1 and 2 described below.

In step 1, a terminal receives a signal sent by a base station at a first time-frequency position, and detects the received signal.

In step 2, when the received signal is detected to be a first signal by the terminal, the terminal detects the physical downlink channel; and when the received signal is detected to be a second signal by the terminal, the terminal does not detect the physical downlink channel.

Exemplary Embodiment 1b

The signal transmission method in the exemplary embodiment 1 includes steps 1 and 2 described below.

In step 1, a terminal receives a signal sent by a base station at a first time-frequency position, and detects the signal according to a configured connection mode.

In step 2, in condition that the terminal is in a first connection mode, the terminal detects the physical downlink channel when the signal is determined to be a third signal by the terminal, and the terminal does not detect the physical downlink channel when the signal is determined to be a fourth signal by the terminal; or in condition that the terminal is in a second connection mode, the terminal detects the physical downlink channel when the signal is determined to be a fifth signal by the terminal, and the terminal does not detect the physical downlink channel when the signal is determined to be a sixth signal by the terminal.

Exemplary Embodiment 1c

Exemplary embodiment 1c includes steps 1 and 2 described below.

In step 1, a terminal receives a signal sent by a base station at a first time-frequency position, and detects the signal according to a configured connection mode.

In step 2, in condition that the terminal is in the first connection mode, the terminal detects the physical downlink channel only when the signal is determined to be a seventh signal by the terminal; or in condition that the terminal is in the second connection mode, the terminal detects the physical downlink channel only when the signal is determined to be an eighth signal by the terminal.

In one embodiment, the first connection mode is an RRC idle mode, and the second connection mode is an RRC connected mode.

In one embodiment, the physical downlink channel is a PDCCH or a PDSCH. The PDCCH is a physical downlink control channel that carries downlink control information, and may have different names under different systems. For example, for an MTC system, the PDCCH is an MPDCCH while for an NB-IoT system, the PDCCH is an NPDCCH. However, the downlink control channel that carries the physical downlink control information falls within the scope of the present application.

Exemplary Embodiment Two

The signal transmission method in the exemplary embodiment two includes steps 1 and 2 described below.

In step 1, a terminal receives a signal sent by a base station at a first time-frequency position, and detects the received signal.

In step 2, the terminal determines whether to detect a PDCCH according to a detection result for the signal.

Exemplary Embodiment 2a

A frequency domain position of the first time-frequency position contains a narrowband where the signal is located. The narrowband where the signal is located is a PNB or a narrowband where the PDCCH is located.

Exemplary Embodiment 2b

A frequency domain position of the first time-frequency position contains a resource block where the signal is located. The resource block corresponding to the signal is a resource block (RB) where paging is located or an RB where the PDCCH is located.

Exemplary Embodiment 2c

Determining the RB where the signal is located contained at the frequency domain position includes: determining a narrowband according to a PNB or a narrowband where the PDCH is located, determining an RB in the narrowband according to a UE_ID, that is, {RB_index}=UE_ID mod Nprb, where Nprb is the number of available physical resource blocks (PRBs) in the narrowband.

Exemplary Embodiment 2d

Determining the narrowband and the RB where the signal is located contained at the frequency domain position includes: determining {narrowband and RB} in the first time-frequency position according to the UE_ID, that is, {NB_index, RB_index}=UE_ID mod (Nn*Nprb), where Nn is the number of available narrowbands, and Nprb is the number of available PRBs in the narrowband. One example is shown as Table 1, and Table 1 is a correspondence table according to the exemplary embodiment 2d.

TABLE 1

| UE_ID mod (Nn*Nprb) | NB_index | PRB_index |
| --- | --- | --- |
| 0 | 0 | 0 |
| 1 | 0 | 1 |
| 2 | 0 | 2 |
| 4 | 0 | 3 |
| 5 | 0 | 4 |
| 6 | 0 | 5 |
| 7 | 1 | 0 |
| ... | ... | ... |

The above table is merely illustrative and is for the propose of describing that the NB_index and the RB_index are implicitly obtained according to the UE_ID.

Exemplary Embodiment 2e

A time domain position in the first time-frequency position contains a subframe where the signal is located. The subframe where the signal is located is determined according to a starting position of a PDCCH search space and the number of repetitions of the signal. For paging information, a starting subframe of the search space is obtained according to a PO; for data, the starting subframe of the search space is a subframe meeting the following equation:

$$(10n_f + \lfloor n_s/2 \rfloor) \bmod T = \lfloor \alpha_{offset} \cdot T \rfloor, \text{ where } T = R_{max} \cdot G,$$
and $R_{max}$, $G$ and $\alpha_{offset}$ are configured by the base station via high-layer signaling.

One example is that assuming a subframe index k is a subframe where the PO is located and the number of repetitions when the signal is transmitted is K subframes, subframes corresponding to the first time-frequency position are subframes from a subframe with a subframe index k−K−1 to a subframe with a subframe index k−1; that is, a subframe index corresponding to an ending subframe of the signal is k−1, and a subframe index corresponding to a starting subframe of the signal is k−K−1; where a value of K is a value indicated by a system information block (SIB) or a value configured via RRC signaling based on the UE.

The base station stores a K value configured for the terminal, and when the terminal accesses the base station again, the base station uses the store K value to configure a K value for the terminal; or the base station reports a K value configured for the terminal to a mobility management entity (MME), and when the terminal accesses the base station again, the base station uses the K value in the MME to configure a K value for the terminal; or the terminal reports its own type, and the base station configures different K values according to the terminal type reported by the terminal.

Exemplary Embodiment 2f

The subframe where the signal is located contained at the time domain position is determined according to a DRX starting position and the number of repetitions when the signal is transmitted.

One example is that assuming a subframe index k is a the DRX starting subframe and the number of repetitions when the signal is transmitted is K subframes, subframes corresponding to the first time-frequency position are subframes from a subframe with a subframe index k−K−1 to a subframe with a subframe index k−1; that is, a subframe index corresponding to an ending subframe of the signal is k−1, and a subframe index corresponding to a starting subframe of the signal is k−K−1.

Exemplary Embodiment 2g

The subframe where the signal is located contained at the time domain position is determined according to a starting position of the PDCCH search space, the number of repetitions of the signal and a first offset.

Figure 3:
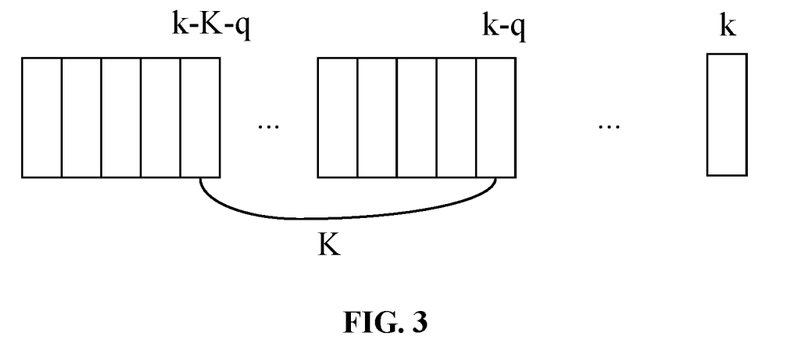
FIG. 3 is a schematic diagram of determination of a subframe position according to an exemplary embodiment 2g of the present application.

One example is that assuming a subframe index k is a subframe where the PO is located and the number of subframes required for signal transmission is K, a subframe index corresponding to an ending subframe of the signal is k−q, and a subframe index corresponding to a starting subframe of the signal is k−K−q; where the first offset q is a positive integer greater than or equal to 0. As shown in FIG. 3, FIG. 3 is a schematic diagram of determination of a subframe position according to the exemplary embodiment 2g of the present application.

In FIG. 3, a value of K is a value indicated by SIB or a value configured via RRC signaling based on the UE. The base station stores a K value configured for the terminal, and when the terminal accesses the base station again, the base station uses the store value to configure a K value for the terminal; or the base station reports a K value configured for the terminal to an MME, and when the terminal accesses the base station again, the base station uses the K value in the MME to configure a K value for the terminal; or the terminal reports its own type, and the base station configures different K values according to the terminal type reported by the terminal.

Exemplary Embodiment 2h

Figure 4:
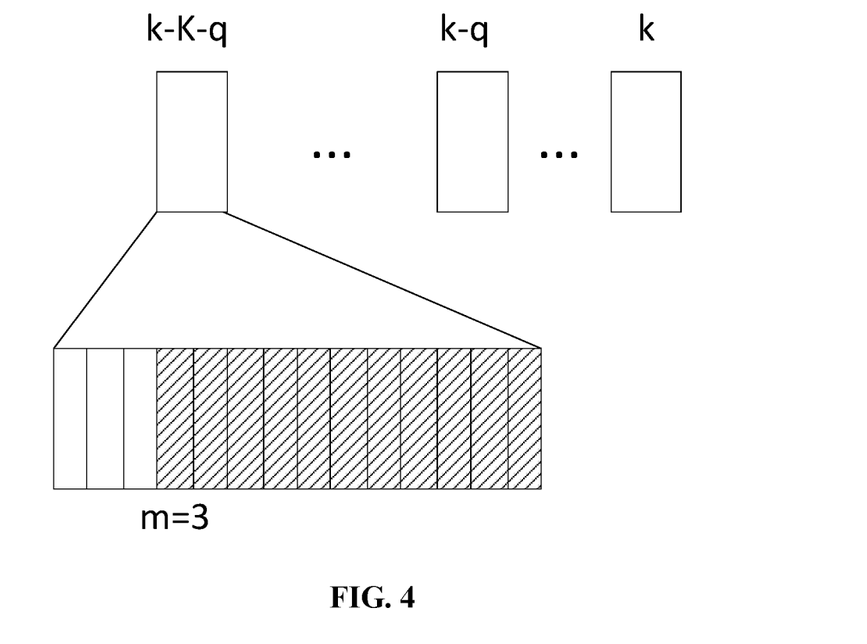
FIG. 4 is a schematic diagram of an exemplary embodiment 2h of the present application.

The OFDM symbol where the signal is located contained at the time domain position is symbols in the subframe from an m2-th OFDM symbol to the end of the subframe; where m2 is a positive integer greater than or equal to 1. One example is shown in FIG. 4, and FIG. 4 is a schematic diagram according to the exemplary embodiment 2h of the present application. In FIG. 4, it is assumed that m2 equals to 3.

Exemplary Embodiment 2i

Determining the OFDM symbol where the signal is located contained at the time domain position includes: determining an OFDM symbol where the signal is located according to coverage of the terminal; where under conventional coverage, the OFDM symbol where the signal is located is at least one of a second OFDM symbol and a third OFDM symbol in the subframe, or under coverage enhancement, the OFDM symbol where the signal is located is symbols in the subframe from an m1-th OFDM symbol to an end of the subframe, where m1 is a positive integers greater than or equal to 0.

Exemplary Embodiment Three

The signal transmission method in the exemplary embodiment three includes steps 1 and 2 described below.

In step 1, a terminal receives a signal sent by a base station at a first time-frequency position, and detects the received signal.

In step 2, when the terminal detects the received signal as a first signal, the terminal detects the PDCCH; and when the terminal detects the received signal as a second signal, the terminal does not detect the PDCCH.

In the above step 1, the UE generates a sequence 1 corresponding to the first signal and a sequence 2 corresponding to the second signal, and detects sequences corresponding to received signals sent by the base station respectively using the sequence 1 and the sequence 2. When the UE detects that an energy peak corresponding to the sequence 1 is greater than an energy peak corresponding to the sequence 2, the UE determines the received signal detected to be the first signal, and when the UE detects that the energy peak corresponding to the sequence 2 is greater than the energy peak corresponding to the sequence 1, the UE determines the received signal sent from the base station to the UE as the second signal.

Exemplary Embodiment 3a

It is assumed that a sequence corresponding to the signal is a ZC sequence $r_{(u,v)}(n)$, where $0<n<=N-1$, u is a root sequence index corresponding to the ZC sequence, a value of u is obtained according to a cell index, and v is a cyclic shift index corresponding to the ZC sequence.

For the sequence 1 corresponding to the first signal, the value of v is obtained according to a cyclic shift index 1 corresponding to the first signal.

For the sequence 2 corresponding to the second signal, the value of v is obtained according to a cyclic shift index 2 corresponding to the second signal.

The cyclic shift index 1 and the cyclic shift index 2 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

There is an example: assuming the ZC sequence is a ZC sequence with a length of 132 obtained after a ZC sequence with a length of 131 is extended (assuming that the number of sub-carriers is 12, the number of OFDM symbols is 11, and in this case, the sequence length is 132), assuming that the cell index is 1 and then u equals to 1, assuming that the cyclic shift index 1 and the cyclic shift index 2 are values meeting that the cyclic shift spacing therebetween is maximum, that is, the cyclic shift index 1 is a sequence with a cyclic shift of 0 and the cyclic shift index 2 is a sequence with a cyclic shift of 66, the sequence 1 corresponding to the first signal is $r_{(1,0)}(n)$, and the sequence 2 corresponding to the second signal is $r_{(1,66)}(n)$, where $0<n<=131$.

Exemplary Embodiment 3b

It is assumed that a sequence corresponding to the signal is a ZC sequence $r_{(u,v)}(n)$ and a PN sequence C(n), that is, $r_{(u,v)}(n)*C(n)$, where $0<n<=N-1$, u is a root sequence index, v is a cyclic shift index, an initial value $C_{initial}$ of the PN sequence is obtained according to a cell index, and a value of u is obtained according to a terminal index.

For the sequence 1 corresponding to the first signal, the value of v is obtained according to a cyclic shift index 1 corresponding to the first signal.

For the sequence 2 corresponding to the second signal, the value of v is obtained according to a cyclic shift index 2 corresponding to the second signal.

The cyclic shift index 1 and the cyclic shift index 2 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 3c

It is assumed that a sequence corresponding to the signal is a ZC sequence $r_{(u,v)}(n)$ and a PN sequence $C(n)$, that is, $r_{(u,v)}(n)*C(n)$, where $0<n<=N-1$, u is a root sequence index corresponding to the ZC sequence, v is a cyclic shift index corresponding to the ZC sequence, a value of u is obtained according to a cell index, and an initial value $C_{initial}$ of the PN sequence is obtained according to a terminal index.

For the sequence 1 corresponding to the first signal, the value of v is obtained according to a cyclic shift index 1 corresponding to the first signal.

For the sequence 2 corresponding to the second signal, the value of v is obtained according to a cyclic shift index 2 corresponding to the second signal.

The cyclic shift index 1 and the cyclic shift index 2 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 3d

It is assumed that a sequence corresponding to the signal is a ZC sequence $r_{(u,v)}(n)$ and a PN sequence $C(n)$, that is, $r_{(u,v)}(n)*C(n)$, where $0<n<=N-1$, u is a root sequence index corresponding to the ZC sequence, v is a cyclic shift index corresponding to the ZC sequence, a value of u is obtained according to a cell index, and an initial value $C_{initial}$ of the PN sequence is obtained according to a terminal index.

For the sequence 1 corresponding to the first signal, the value of v is obtained according to a cyclic shift index 1 corresponding to the first signal.

For the sequence 2 corresponding to the second signal, the value of v is obtained according to a cyclic shift index 2 corresponding to the second signal.

The cyclic shift index 1 and the cyclic shift index 2 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 3e

It is assumed that a sequence corresponding to the signal is a ZC sequence $r_{(u,v)}(n)$ and a PN sequence $C(n)$, that is, $r_{(u,v)}(n)*C(n)$, where $0<n<=N-1$, u is a root sequence index corresponding to the ZC sequence, v is a cyclic shift index corresponding to the ZC sequence, a value of u is obtained according to a cell index, and an initial value $C_{initial}$ of the PN sequence is obtained according to a preset value.

For the sequence 1 corresponding to the first signal, the value of v is obtained according to a cyclic shift index 1 corresponding to the first signal.

For the sequence 2 corresponding to the second signal, the value of v is obtained according to a cyclic shift index 2 corresponding to the second signal.

The cyclic shift index 1 and the cyclic shift index 2 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment Four

The signal transmission method in this exemplary embodiment includes steps 1 and 2 described below.

In step 1, a terminal receives a signal sent by a base station at a first time-frequency position, and detects the signal according to a configured connection mode.

In step 2, in condition that the terminal is in a first connection mode, the terminal detects the PDCCH when the terminal determines the signal as a third signal, and the terminal does not detect the PDCCU when the terminal determines the signal as a fourth signal; or in condition that the terminal is in a second connection mode, the terminal detects the PDCCU when the terminal determines the signal as a fifth signal, and the terminal does not detect the PDCCU when the terminal determines the signal as a sixth signal.

In the above step 1, when the terminal is in the RRC idle mode, the UE generates a sequence 3 corresponding to the third signal and a sequence 4 corresponding to the fourth signal, and detects sequences corresponding to received signals sent by the base station respectively using the sequence 4 and the sequence 3. When the UE detects that an energy peak corresponding to the sequence 3 is greater than an energy peak corresponding to the sequence 4, the UE determines the corresponding detected signal as the third signal, and when the UE detects that the energy peak corresponding to the sequence 4 is greater than the energy peak corresponding to the sequence 3, the UE determines the received signal sent to the UE as the fourth signal. When the terminal is in the connected mode, the UE generates a sequence 5 corresponding to the fifth signal and a sequence 6 corresponding to the sixth signal, and detects sequences corresponding to received signals sent by the base station respectively using the sequence 5 and the sequence 6. When the UE detects that an energy peak corresponding to the sequence 5 is greater than an energy peak corresponding to the sequence 6, the UE determines the corresponding signal detected to be the fifth signal, and when the UE detects that the energy peak corresponding to the sequence 6 is greater than the energy peak corresponding to the sequence 5, the UE determines the received signal sent to the UE as the sixth signal.

Exemplary Embodiment 4a

It is assumed that a sequence corresponding to the signal is a ZC sequence $r_{(u,v)}(n)$ where $0<n<=N-1$, u is a root sequence index corresponding to the ZC sequence, a value of u is obtained according to a cell index, and v is a cyclic shift index corresponding to the ZC sequence.

For the sequence 3 corresponding to the third signal, the value of v is obtained according to a cyclic shift index 3 corresponding to the first signal.

For the sequence 4 corresponding to the fourth signal, the value of v is obtained according to a cyclic shift index 4 corresponding to the second signal.

For the sequence 5 corresponding to the fifth signal, the value of v is obtained according to a cyclic shift index 5 corresponding to the first signal.

For the sequence 6 corresponding to the sixth signal, the value of v is obtained according to a cyclic shift index 6 corresponding to the second signal.

The cyclic shift index 3, the cyclic shift index 4, the cyclic shift index 5 and the cyclic shift index 6 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

There is an example: assuming the ZC sequence is a ZC sequence with a length of 132 obtained after a ZC sequence with a length of 131 is extended (assuming that the number of sub-carriers is 12, and the number of OFDM symbols is 11), assuming that the cell index is 1 and then u equals to 1, assuming that the cyclic shift index 3, the cyclic shift index 4, the cyclic shift index 5 and the cyclic shift index 6 are values meeting that the cyclic shift spacing therebetween is maximum, that is, the cyclic shift index 3 is a sequence with a cyclic shift of 0, the cyclic shift index 4 is a sequence with a cyclic shift of 33, the cyclic shift index 5 is a sequence with a cyclic shift of 66 and the cyclic shift index 6 is a sequence with a cyclic shift of 99, the sequence 1 corresponding to the third signal is $r_{(1,0)}(n)$, the sequence 2 corresponding to the fourth signal is $r_{(1,33)}(n)$, the sequence 1 corresponding to the fifth signal is $r_{(1,66)}(n)$, and the sequence 2 corresponding to the sixth signal is $r_{(1,99)}(n)$, where $0<n<=131$.

Exemplary Embodiment 4b

It is assumed that a sequence corresponding to the signal is a ZC sequence $r_{(u,v)}(n)$ and a PN sequence $C(n)$, that is, $r_{(u,v)}(n)*C(n)$, where $0<n<=N-1$, u is a root sequence index, v is a cyclic shift index, an initial value $C_{initial}$ of the PN sequence is obtained according to a cell index, and a value of u is obtained according to a terminal index.

For the sequence 3 corresponding to the third signal, the value of v is obtained according to a cyclic shift index 3 corresponding to the third signal.

For the sequence 4 corresponding to the fourth signal, the value of v is obtained according to a cyclic shift index 4 corresponding to the fourth signal.

For the sequence 5 corresponding to the fifth signal, the value of v is obtained according to a cyclic shift index 5 corresponding to the fifth signal.

For the sequence 6 corresponding to the sixth signal, the value of v is obtained according to a cyclic shift index 6 corresponding to the sixth signal.

The cyclic shift index 3, the cyclic shift index 4, the cyclic shift index 5 and the cyclic shift index 6 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 4c

It is assumed that a sequence corresponding to the signal is a ZC sequence $r_{(u,v)}(n)$ and a PN sequence $C(n)$, that is, $r_{(u,v)}(n)*C(n)$, where $0<n<=N-1$, u is a root sequence index corresponding to the ZC sequence, v is a cyclic shift index corresponding to the ZC sequence, a value of u is obtained according to a cell index, and an initial value $C_{initial}$ of the PN sequence is obtained according to a terminal index.

For the sequence 3 corresponding to the third signal, the value of v is obtained according to a cyclic shift index 3 corresponding to the third signal.

For the sequence 4 corresponding to the fourth signal, the value of v is obtained according to a cyclic shift index 4 corresponding to the fourth signal.

For the sequence 5 corresponding to the fifth signal, the value of v is obtained according to a cyclic shift index 5 corresponding to the fifth signal.

For the sequence 6 corresponding to the sixth signal, the value of v is obtained according to a cyclic shift index 6 corresponding to the sixth signal.

The cyclic shift index 3, the cyclic shift index 4, the cyclic shift index 5 and the cyclic shift index 6 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 4d

It is assumed that a sequence corresponding to the signal is at least one of: a ZC sequence $r_{(u,v)}(n)$ and a PN sequence $C(n)$, where $0<n<=N-1$, u is a root sequence index corresponding to the ZC sequence, a value of u is obtained according to a cell index, v is a cyclic shift index corresponding to the ZC sequence, and an initial value $C_{initial}$ of the PN sequence is obtained according to a terminal index.

For the sequence 3 corresponding to the third signal: ZC sequence $r_{(u,v)}(n)$, the value of v is obtained according to a cyclic shift index 3 corresponding to the third signal.

For the sequence 4 corresponding to the fourth signal: ZC sequence $r_{(u,v)}(n)$, the value of v is obtained according to a cyclic shift index 4 corresponding to the fourth signal.

For the sequence 5 corresponding to the fifth signal: ZC sequence $r_{(u,v)}(n)$ and PN sequence $C(n)$, the value of v is obtained according to a cyclic shift index 5 corresponding to the fifth signal.

For the sequence 6 corresponding to the sixth signal: ZC sequence $r_{(u,v)}(n)$ and PN sequence $C(n)$, the value of v is obtained according to a cyclic shift index 6 corresponding to the sixth signal.

The cyclic shift index 3, the cyclic shift index 4, the cyclic shift index 5 and the cyclic shift index 6 are at least one of: pre-determined values, or values meeting that the cyclic shift spacing therebetween is maximum; or are values configured via high-layer signaling.

Exemplary Embodiment 4e

It is assumed that a sequence corresponding to the signal is at least one of: a ZC sequence $r_{(u,v)}(n)$ and a PN sequence C(n), where 0<n<=N−1, u is a root sequence index corresponding to the ZC sequence, a value of u is obtained according to a terminal index, v is a cyclic shift index corresponding to the ZC sequence, and an initial value $C_{initial}$ of the PN sequence is obtained according to a cell index.

For the sequence 3 corresponding to the third signal: ZC sequence $r_{(u,v)}(n)$, the value of v is obtained according to a cyclic shift index 3 corresponding to the third signal.

For the sequence 4 corresponding to the fourth signal: ZC sequence $r_{(u,v)}(n)$, the value of v is obtained according to a cyclic shift index 4 corresponding to the fourth signal.

For the sequence 5 corresponding to the fifth signal: ZC sequence $r_{(u,v)}(n)$ and PN sequence C(n), the value of v is obtained according to a cyclic shift index 5 corresponding to the fifth signal.

For the sequence 6 corresponding to the sixth signal: ZC sequence $r_{(u,v)}(n)$ and PN sequence C(n), the value of v is obtained according to a cyclic shift index 6 corresponding to the sixth signal.

The cyclic shift index 3, the cyclic shift index 4, the cyclic shift index 5 and the cyclic shift index 6 are at least one of: pre-determined values, or values meeting that the cyclic shift spacing therebetween is maximum; or are values configured via high-layer signaling.

Exemplary Embodiment 4f

It is assumed that a sequence corresponding to the signal is at least one of a ZC sequence $r_{(u,v)}(n)$ and a PN sequence C(n), where 0<n<=N−1, u is a root sequence index corresponding to the ZC sequence, a value of u is obtained according to a terminal index, v is a cyclic shift index corresponding to the ZC sequence, and an initial value $C_{initial}$ of the PN sequence is obtained according to a preset value.

For the sequence 3 corresponding to the third signal: ZC sequence $r_{(u,v)}(n)$, the value of v is obtained according to a cyclic shift index 3 corresponding to the third signal.

For the sequence 4 corresponding to the fourth signal: ZC sequence $r_{(u,v)}(n)$, the value of v is obtained according to a cyclic shift index 4 corresponding to the fourth signal.

For the sequence 5 corresponding to the fifth signal: ZC sequence $r_{(u,v)}(n)$ and PN sequence C(n), the value of v is obtained according to a cyclic shift index 5 corresponding to the fifth signal.

For the sequence 6 corresponding to the sixth signal: ZC sequence $r_{(u,v)}(n)$ and PN sequence C(n), the value of v is obtained according to a cyclic shift index 6 corresponding to the sixth signal.

The cyclic shift index 3, the cyclic shift index 4, the cyclic shift index 5 and the cyclic shift index 6 are at least one of: pre-determined values, or values meeting that the cyclic shift spacing therebetween is maximum; or are values configured via high-layer signaling.

Exemplary Embodiment Five

The signal transmission method in the exemplary embodiment five includes steps 1 and 2 described below.

In step 1, a terminal receives a signal sent by a base station at a first time-frequency position, and detects the signal according to a configured connection mode.

In step 2, in condition that the terminal is in the first connection mode, the terminal detects the PUCCH only when the terminal detects the signal as a seventh signal; or in condition that the terminal is in the second connection mode, the terminal detects the PDCCH only when the terminal detects the signal as an eighth signal.

In the above step 1, when the terminal is in the RRC idle mode, the UE generates a sequence 7 corresponding to the seventh signal, and detects a sequence corresponding to the received signal sent by the base station using the sequence 7. When the UE detects that an energy peak corresponding to the sequence 7 is greater than a preset threshold, the UE determines the corresponding detected signal as the seventh signal.

When the terminal is in the RRC connected mode, the UE generates a sequence 8 corresponding to the eighth signal, and detects a sequence corresponding to the received signal sent by the base station using the sequence 8. When the UE detects that an energy peak corresponding to the sequence 8 is greater than a preset threshold, the UE determines the corresponding signal as the eighth signal.

Exemplary Embodiment 5a

It is assumed that a sequence corresponding to the signal is a ZC sequence $r_{(u,v)}(n)$, where 0<n<=N−1, u is a root sequence index corresponding to the ZC sequence, a value of u is obtained according to a cell index, and v is a cyclic shift index corresponding to the ZC sequence.

For the sequence 7 corresponding to the seventh signal, the value of v is obtained according to a cyclic shift index 7 corresponding to the seventh signal.

For the sequence 8 corresponding to the eighth signal, the value of v is obtained according to a cyclic shift index 8 corresponding to the eighth signal.

The cyclic shift index 7 and the cyclic shift index 8 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 5b

It is assumed that a sequence corresponding to the signal is a ZC sequence $r_{(u,v)}(n)$ and a PN sequence C(n), that is, $r_{(u,v)}(n)*C(n)$, where $0<_{n<=N-}1$, u is a root sequence index, v is a cyclic shift index, an initial value $C_{initial}$ of the PN sequence is obtained according to a cell index, and a value of u is obtained according to a terminal index.

For the sequence 7 corresponding to the seventh signal, the value of v is obtained according to a cyclic shift index 7 corresponding to the seventh signal.

For the sequence 8 corresponding to the eighth signal, the value of v is obtained according to a cyclic shift index 8 corresponding to the eighth signal.

The cyclic shift index 7 and the cyclic shift index 8 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 5c

It is assumed that a sequence corresponding to the signal is a ZC sequence $r_{(u,v)}(n)$ and a PN sequence C(n), where $0<n\leq N-1$, u is a root sequence index corresponding to the ZC sequence, v is a cyclic shift index corresponding to the ZC sequence, a value of u is obtained according to a cell index, and an initial value $C_{initial}$ of the PN sequence is obtained according to a terminal index.

For the sequence 7 corresponding to the seventh signal, the value of v is obtained according to a cyclic shift index 7 corresponding to the seventh signal.

For the sequence 8 corresponding to the eighth signal, the value of v is obtained according to a cyclic shift index 8 corresponding to the eighth signal.

The cyclic shift index 7 and the cyclic shift index 8 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 5d

It is assumed that a sequence corresponding to the signal is at least one of: a ZC sequence $r_{(u,v)}(n)$ and a PN sequence C(n), where $0<n\leq N-1$, u is a root sequence index corresponding to the ZC sequence, a value of u is obtained according to a cell index, v is a cyclic shift index corresponding to the ZC sequence, and an initial value $C_{initial}$ of the PN sequence is obtained according to a terminal index.

For the sequence 7 corresponding to the seventh signal: ZC sequence $r_{(u,v)}(n)$, the value of v is obtained according to a cyclic shift index 7 corresponding to the seventh signal.

For the sequence 8 corresponding to the eighth signal: ZC sequence and PN sequence $r_{(u,v)}(n)$, the value of v is obtained according to a cyclic shift index 8 corresponding to the eighth signal.

The cyclic shift index 7 and the cyclic shift index 8 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 5e

It is assumed that a sequence corresponding to the signal is a ZC sequence $r_{(u,v)}(n)$ and a PN sequence C(n), where $0<n\leq N-1$, u is a root sequence index corresponding to the ZC sequence, v is a cyclic shift index corresponding to the ZC sequence, a value of u is obtained according to a cell index, and an initial value $C_{initial}$ of the PN sequence is obtained according to a terminal index.

For the sequence 7 corresponding to the seventh signal, the value of v is obtained according to a cyclic shift index 7 corresponding to the seventh signal.

For the sequence 8 corresponding to the eighth signal, the value of v is obtained according to a cyclic shift index 8 corresponding to the eighth signal.

The cyclic shift index 7 and the cyclic shift index 8 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 5f

It is assumed that a sequence corresponding to the signal is at least one of: a ZC sequence $r_{(u,v)}(n)$ and a PN sequence C(n), where $0<n\leq N-1$, u is a root sequence index corresponding to the ZC sequence, a value of u is obtained according to a cell index, v is a cyclic shift index corresponding to the ZC sequence, and an initial value $C_{initial}$ of the PN sequence is obtained according to a terminal index.

For the sequence 7 corresponding to the seventh signal: ZC sequence $r_{(u,v)}(n)$, the value of v is obtained according to a cyclic shift index 7 corresponding to the seventh signal.

For the sequence 8 corresponding to the eighth signal: ZC sequence $r_{(u,v)}(n)$ and PN sequence, the value of v is obtained according to a cyclic shift index 8 corresponding to the eighth signal. The cyclic shift index 7 and the cyclic shift index 8 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 5g

It is assumed that a sequence corresponding to the signal is a ZC sequence $r_{(u,v)}(n)$ and a PN sequence C(n), where $0<n\leq N-1$, u is a root sequence index corresponding to the ZC sequence, v is a cyclic shift index corresponding to the ZC sequence, a value of u is obtained according to a cell index, and an initial value $C_{initial}$ of the PN sequence is obtained according to a terminal index.

For the sequence 7 corresponding to the seventh signal, the value of v is obtained according to a cyclic shift index 7 corresponding to the seventh signal.

For the sequence 8 corresponding to the eighth signal, the value of v is obtained according to a cyclic shift index 8 corresponding to the eighth signal.

The cyclic shift index 7 and the cyclic shift index 8 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 5h

It is assumed that a sequence corresponding to the signal is at least one of: a ZC sequence $r_{(u,v)}(n)$ and a PN sequence C(n), where $0<n\leq N-1$, u is a root sequence index corresponding to the ZC sequence, a value of u is obtained according to a terminal index, v is a cyclic shift index corresponding to the ZC sequence, and an initial value $C_{initial}$ of the PN sequence is obtained according to a cell index.

For the sequence 7 corresponding to the seventh signal: ZC sequence $r_{(u,v)}(n)$, the value of v is obtained according to a cyclic shift index 7 corresponding to the seventh signal.

For the sequence 8 corresponding to the eighth signal: ZC sequence $r_{(u,v)}(n)$ and PN sequence C(n), the value of v is obtained according to a cyclic shift index 8 corresponding to the eighth signal.

The cyclic shift index 7 and the cyclic shift index 8 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 5i

It is assumed that a sequence corresponding to the signal is at least one of a ZC sequence $r_{(u,v)}(n)$, and a PN sequence C(n), where $0<n<=N-1$, u is a root sequence index corresponding to the ZC sequence, a value of u is obtained according to a terminal index, v is a cyclic shift index corresponding to the ZC sequence, and an initial value $C_{initial}$ of the PN sequence is obtained according to a preset value.

For the sequence 7 corresponding to the seventh signal: ZC sequence, $r_{(u,v)}(n)$ the value of v is obtained according to a cyclic shift index 7 corresponding to the seventh signal.

For the sequence 8 corresponding to the eighth signal: ZC sequence $r_{(u,v)}(n)$ and PN sequence C(n), the value of v is obtained according to a cyclic shift index 8 corresponding to the eighth signal.

The cyclic shift index 7 and the cyclic shift index 8 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment Six

The signal transmission method in the exemplary embodiment six includes steps 1 and 2 described below.

In step 1, a terminal receives a signal sent by a base station at a first time-frequency position, and detects the received signal.

A frequency domain of the first time-frequency position is: a narrowband and an RB in the narrowband.

The narrowband is a PNB. The RB in the narrowband is determined according to a UE_ID, that is, {RB_index}=UE_ID mod Nprb, where Bprb is the number of available PRBs in the narrowband.

A time domain of the first time-frequency position is: a subframe and an OFDM in the subframe.

The subframe is determined according to at least one of: a starting position of the PDCCH search space, a first offset, or the number of repetitions when the signal is transmitted. For paging, the starting position of the search space is obtained according to a PO subframe; assuming that the subframe k is the subframe where the PO is located, a value of the first offset is 1, and the number of repetitions is K, the subframe where the signal is located is subframes from a subframe with a subframe index of k–K–1 to a subframe with a subframe index of k–1, where a value of K is configured via high-layer signaling.

The OFDM symbol in the subframe is symbols from a third OFDM symbol in the subframe to an end of the subframe.

The sequence corresponding to the signal is a ZC sequence, where $0<n<=N-1$, u is a root sequence index, and v is a cyclic shift index.

For the sequence 1 corresponding to the first signal, the root sequence index corresponding to the ZC sequence is obtained according to a cell index, and the cyclic shift index corresponding to the ZC sequence is obtained according to a cyclic shift index 1 corresponding to the first signal.

For the sequence 2 corresponding to the second signal, the root sequence index corresponding to the ZC sequence is obtained according to a cell index, and the cyclic shift index corresponding to the ZC sequence is obtained according to a cyclic shift index 2 corresponding to the second signal.

The cyclic shift index 1 and the cyclic shift index 2 are at least one of: pre-determined values, or values meeting that the cyclic shift spacing therebetween is maximum; or are values configured via high-layer signaling.

The step 2 is the same as the step 2 in the exemplary embodiment 1a.

Exemplary Embodiment Seven

The signal transmission method in this exemplary embodiment includes steps 1 and 2 described below.

In step 1, a base station sends a signal at a preset first time-frequency position.

In step 2, the base station determines whether to send a corresponding physical downlink channel according to the sending of the signal.

Exemplary Embodiment 7a

The signal transmission method in the exemplary embodiment 7a includes steps 1 and 2 described below.

In step 1, a base station sends a signal at a preset first time-frequency position.

In step 2, when the signal sent by the base station is a first signal, the base station sends the corresponding physical downlink channel; and when the signal sent by the base station is a second signal, the base station does not send the corresponding physical downlink channel.

Exemplary Embodiment 7b

The signal transmission method of the exemplary embodiment 7b includes steps 1 and 2 described below.

In step 1, the base station sends a signal at a preset first time-frequency position according to a connection mode of the terminal.

In step 2, in condition that the terminal is in a first connection mode, when the signal sent by the base station is a third signal, the base station sends the corresponding physical downlink channel; when the signal sent by the base station is a fourth signal, the base station does not send the corresponding physical downlink channel; or in condition that the terminal is in a second connection mode, when the signal sent by the base station is a fifth signal, the base station sends the corresponding physical downlink channel; when the signal sent by the base station is a sixth signal, the base station does not send the corresponding physical downlink channel.

Exemplary Embodiment 7c

The signal transmission method of this exemplary embodiment includes steps 1 and 2 described below.

In step 1, the base station sends a signal at a preset first time-frequency position according to a connection mode of the terminal.

The preset first time-frequency position includes a first frequency domain position and a first time domain position.

The first frequency domain position contains a narrowband where the signal is located and an RB where the signal is located.

The narrowband where the signal is located is: a PNB where paging is located or a narrowband where the PDCCH is located.

The RB where the signal is located is: an RB where paging is located or an RB where the PDCCH is located.

The first time domain position contains a subframe where the signal is located and an OFDM symbol where the signal is located.

The subframe where the signal is located is determined according to a starting position of a PDCCH search space and the number of repetitions of the signal. Assuming that the subframe index k is a subframe where a PO is located and the the number of repetitions when the signal is transmitted is K subframes, an index corresponding to the first time domain position is subframes from a subframe with a subframe index of k−K−1 to a subframe with a subframe index of k−1; that is, a subframe index corresponding to an ending subframe of the signal is k−1, and a subframe index corresponding to a starting subframe of the signal is k−K−1; where a value of K is a value specified by the SIB or a value configured via the RRC signaling based on the UE. The base station stores a K value configured for the terminal, and when the terminal accesses the base station again, the base station uses the stored K value as the K value configured for the terminal; or the base station reports a K value configured for the terminal to an MME, and when the terminal accesses the base station again, the base station uses the K value in the MME to configure a K value for the terminal; or the terminal reports its own type, and the base station configures different K values according to the terminal type reported by the terminal.

The OFDM symbol where the signal is located is determined according to coverage of the terminal. Under conventional coverage, the OFDM symbol where the signal is located is at least one of a second OFDM symbol and a third OFDM symbol in the subframe, or under coverage enhancement, the OFDM symbol where the signal is located is symbols in the subframe from an m1-th OFDM symbol to an end of the subframe, where m1 is a positive integer greater than or equal to 0.

In step 2, in condition that the terminal is in a first connection mode, the base station sends the corresponding physical downlink channel only when the signal sent by the base station is a seventh signal; or in condition that the terminal is in a second connection mode, the base station sends the corresponding physical downlink channel only when the signal sent by the base station is an eighth signal.

Exemplary Embodiment 7d

The signal transmission method of this exemplary embodiment includes steps 1 and 2 described below.

In step 1, the base station sends a signal at a preset first time-frequency position.

In step 2, when the signal sent by the base station is a first signal, the base station sends the corresponding physical downlink channel; when the signal sent by the base station is a second signal, the base station does not send the corresponding physical downlink channel.

It is assumed that a sequence corresponding to the signal is a ZC sequence $r_{(u,v)}(n)$ and a PN sequence $C(n)$, that is, $r_{(u,v)}(n)*C(n)$, where $0<n<=N-1$, u is a root sequence index corresponding to the ZC sequence, v is a cyclic shift index corresponding to the ZC sequence, a value of u is obtained according to a cell index, and an initial value $C_{initial}$ of the PN sequence is obtained according to a terminal index.

For the sequence 1 corresponding to the first signal, the value of v is obtained according to a cyclic shift index 1 corresponding to the first signal.

For the sequence 2 corresponding to the second signal, the value of v is obtained according to a cyclic shift index 2 corresponding to the second signal.

The cyclic shift index 1 and the cyclic shift index 2 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

Exemplary Embodiment 7e

The signal transmission method of this exemplary embodiment includes steps 1 and 2 described below.

In step 1, the base station sends a signal at a preset first time-frequency position according to a connection mode of the terminal.

In step 2, in condition that the terminal is in a first connection mode, when the signal sent by the base station is a third signal, the base station sends the corresponding physical downlink channel; when the signal sent by the base station is a fourth signal, the base station does not send the corresponding physical downlink channel; or in condition that the terminal is in a second connection mode, when the signal sent by the base station is a fifth signal, the base station sends the corresponding physical downlink channel; when the signal sent by the base station is a sixth signal, the base station does not send the corresponding physical downlink channel.

It is assumed that a sequence corresponding to the signal is at least one of a ZC sequence $r_{(u,v)}(n)$ or a PN sequence $C(n)$, where $0<n<=N-1$, u is a root sequence index corresponding to the ZC sequence, a value of u is obtained according to a terminal index, v is a cyclic shift index corresponding to the ZC sequence, and an initial value $C_{initial}$ of the PN sequence is obtained according to a preset value.

For the sequence 3 corresponding to the third signal: ZC sequence $r_{(u,v)}(n)$, the value of v is obtained according to a cyclic shift index 3 corresponding to the third signal.

For the sequence 4 corresponding to the fourth signal: ZC sequence $r_{(u,v)}(n)$, the value of v is obtained according to a cyclic shift index 4 corresponding to the fourth signal.

For the sequence 5 corresponding to the fifth signal: ZC sequence $r_{(u,v)}(n)$ and PN sequence $C(n)$, the value of v is obtained according to a cyclic shift index 5 corresponding to the fifth signal.

For the sequence 6 corresponding to the sixth signal: ZC sequence $r_{(u,v)}(n)$ and PN sequence $C(n)$, the value of v is obtained according to a cyclic shift index 6 corresponding to the sixth signal.

The cyclic shift index 3, the cyclic shift index 4, the cyclic shift index 5 and the cyclic shift index 6 are at least one of: pre-determined values, or values meeting that the cyclic shift spacing therebetween is maximum; or are values configured via high-layer signaling.

Exemplary Embodiment 7f

The signal transmission method of this exemplary embodiment includes steps 1 and 2 described below.

In step 1, the base station sends a signal at a preset first time-frequency position according to a connection mode of the terminal.

In step 2, in condition that the terminal is in a first connection mode, the base station sends the corresponding physical channel only when the signal sent by the base station is a seventh signal; or in condition that the terminal is in a second connection mode, the base station sends the corresponding physical channel only when the signal sent by the base station is an eighth signal.

Exemplary Embodiment 7g

It is assumed that a sequence corresponding to the signal is at least one of a ZC sequence $r_{(u,v)}(n)$ or a PN sequence C(n), where $0<n<=N-1$, u is a root sequence index corresponding to the ZC sequence, a value of u is obtained according to a terminal index, v is a cyclic shift index corresponding to the ZC sequence, and an initial value $C_{initial}$ of the PN sequence is obtained according to a preset value.

The sequence 7 corresponding to the seventh signal is the ZC sequence $r_{(u,v)}(n)$, and the value of v is obtained according to a cyclic shift index 7 corresponding to the seventh signal.

The sequence 8 corresponding to the eighth signal is the ZC sequence $r_{(u,v)}(n)$ and the PN sequence C(n), and the value of v is obtained according to a cyclic shift index 8 corresponding to the eighth signal.

The cyclic shift index 7 and the cyclic shift index 8 are at least one of: pre-determined values, or values meeting that the cyclic shift spacing therebetween is maximum; or are values configured via high-layer signaling.

The length N of a sequence is determined according to at least one of: the number of sub-carriers in the frequency domain occupied by the signal, or the number of symbols in the time domain occupied by the signal.

The method in the embodiments described above may be implemented by software plus a necessary general-purpose hardware platform, or may of course be implemented by hardware. Based on this understanding, the technical solution of the present application substantially, or the part contributing to the related art, may be embodied in the form of a software product. The computer software product is stored in a storage medium (such as a random access memory (RAM)/read-only memory (ROM), a magnetic disk or an optical disk) and includes several instructions for enabling a terminal device (which may be a mobile phone, a computer, a server, a network device or the like) to execute the method according to each embodiment of the present application.

Embodiment Two

The embodiments of the present application further provide an information transmission apparatus. The apparatus is used for implementing the embodiments described above. What has been described will not be repeated. As used below, the term "module" may be software, hardware or a combination thereof capable of implementing predetermined functions. The apparatus described in the following embodiment is preferably implemented by software, but implementation by hardware or a combination of software and hardware is also possible and conceived.

According to an embodiment of the present application, a signal transmission apparatus is provided. The apparatus may be applied to a terminal side, and includes a receiving module and a detecting module.

The receiving module is configured to receive, at a preset first time-frequency position, a signal sent by a base station.

The detecting module is connected to the receiving module and is configured to detect the signal, and determine whether to detect a physical downlink channel according to a detection result for the signal.

It is to be noted that methods executed by the terminal side in the embodiment one may all be executed by the signal transmission apparatus on the terminal side.

According to another embodiment of the present application, a signal transmission apparatus is further provided. The apparatus may be applied on a base station side, and includes a sending module and a determining module.

The sending module is configured to send a signal at a preset first time-frequency position.

The determining module is connected to the sending module and is configured to determine whether to send a physical downlink channel according to the signal.

It is to be noted that methods executed by the base station side in the embodiment one may all be executed by the signal transmission apparatus on the base station side.

It is to be noted that the modules described above may be implemented by software or hardware. Implementation by hardware may, but may not necessarily, be performed in the following manners: the modules described above are located in the same processor, or the modules described above are located in different processors in any combination form.

Embodiment Three

According to another embodiment of the present application, a processor is further provided.

The processor is configured to execute programs which, when executed, perform the method of any one of embodiments described above.

Embodiment Four

According to another embodiment of the present application, a storage medium is further provided. The storage medium includes stored programs which, when executed, perform the method of any one of embodiments described above.

At last, acronyms and corresponding full names of technical terms in the present application are shown in Table 2.

TABLE 2

| Acronym | Full Name |
| --- | --- |
| PDCCH | Physical Downlink Control Channel |
| PDSCH | Physical Downlink Shared Channel |
| PNB | Paging Narrowband |
| PO | Paging Occasion |
| DRX | Discontinuous Reception |
| eDRX | extended Discontinuous Reception |
| PTW | Paging transmission window |

Each of the above-mentioned modules or steps of the present application may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

What is claimed is:

1. A signal transmission method, comprising:
receiving at a preset first time-frequency position, by a terminal, a signal sent by a base station; and
detecting, by the terminal, the signal, and determining whether to detect a physical downlink channel according to a detection result for the signal,
wherein the first time-frequency position comprises: a subframe where the signal is located comprised in a time domain position of the first time-frequency position;
wherein the subframe where the signal is located is determined according to at least one of: a starting position of a physical downlink control channel (PDCCH) search space, a discontinuous reception (DRX) starting position or an extended DRX (eDRX) starting position, or a number of repetitions of the signal;
wherein the number of repetitions of the signal is configured via high-layer signaling.

2. The method of claim 1, wherein the determining whether to detect the physical downlink channel according to the detection result for the signal comprises:
in condition that the signal is determined to be a first signal by the terminal, detecting, by the terminal, the physical downlink channel;
in condition that the signal is determined to be a second signal by the terminal, not detecting, by the terminal, the physical downlink channel.

3. The method of claim 1, wherein the determining whether to detect the physical downlink channel according to the detection result for the signal comprises:
detecting, by the terminal, the signal according to a connection mode;
in condition that the terminal is in a first connection mode, in response to determining that the signal is a third signal, detecting, by the terminal, the physical downlink channel; and in response to determining that the signal is a fourth signal, not detecting, by the terminal, the physical downlink channel; or
in condition that the terminal is in a second connection mode, in response to determining that the signal is a fifth signal, detecting, by the terminal, the physical downlink channel; and in response to determining that the signal is a sixth signal, not detecting, by the terminal, the physical downlink channel.

4. The method of claim 1, wherein the detecting, by the terminal, the signal, and determining whether to detect the physical downlink channel according to the detection result for the signal comprises:
detecting, by the terminal, the signal according to a connection mode;
in condition that the terminal is in a first connection mode, detecting, by the terminal, the physical downlink channel only when the signal is detected to be a seventh signal; or
in condition that the terminal is in a second connection mode, detecting, by the terminal, the physical downlink channel only when the signal is detected to be an eighth signal.

5. The method of claim 1, wherein the first time-frequency position comprises: a narrowband where the signal is located comprised in a frequency domain position of the first time-frequency position;
wherein the narrowband where the signal is located is a paging narrowband, or a narrowband where a PDCCH is located.

6. The method of claim 1, wherein the first time-frequency position comprises: a resource block where the signal is located comprised in a frequency domain position of the first time-frequency position;
wherein the resource block where the signal is located is one of: a resource block in a paging narrowband determined according to a terminal index, a resource block where paging is located, or a resource block where a PDCCH is located.

7. The method of claim 1, wherein a first offset is also used to determine the subframe where the signal is located;
wherein the first offset is configured via high-layer signaling or is preset.

8. The method of claim 1, wherein the first time-frequency position comprises: an orthogonal frequency division multiplexing (OFDM) symbol where the signal is located comprised in a time domain position of the first time-frequency position;
wherein the OFDM symbol where the signal is located is one of:
at least one of a second OFDM symbol and a third OFDM symbol in the subframe under conventional coverage;
symbols in the subframe from an m1-th OFDM symbol to an end of the subframe under coverage enhancement; or
symbols in the subframe from an m2-th OFDM symbol to an end of the subframe;
wherein m1 and m2 are positive integers greater than or equal to 0.

9. The method according to claim 1, further comprising:
determining a Zadoff-Chu (ZC) sequence corresponding to the signal, wherein the terminal determines a root sequence index of the ZC sequence according to a cell index; or
determining a ZC sequence and a pseudo-noise (PN) sequence corresponding to the signal, wherein the terminal determines a root sequence index of the ZC sequence according to a cell index and determines an initial value of the PN sequence according to a terminal index;
wherein a length of a sequence is determined according to at least one of: a number of sub-carriers in a frequency domain occupied by the signal, or a number of OFDM symbols in a time domain occupied by the signal.

10. The method of claim 9, wherein the determining whether to detect the physical downlink channel according to the detection result for the signal comprises:
in condition that the signal is determined to be a first signal by the terminal, detecting, by the terminal, the physical downlink channel;
in condition that the signal is determined to be a second signal by the terminal, not detecting, by the terminal, the physical downlink channel;
wherein determining, by the terminal, a cyclic shift index of the ZC sequence comprised in the first signal according to a cyclic shift index 1 corresponding to the first signal, and determining, by the terminal, a cyclic shift index of the ZC sequence comprised in the second signal according to a cyclic shift index 2 corresponding to the second signal; and wherein the cyclic shift index 1 and the cyclic shift index 2 are pre-determined values, or are cyclic shift indexes having a maximum cyclic shift spacing between the cyclic shift indexes.

11. The method of claim 9, wherein the determining whether to detect the physical downlink channel according to the detection result for the signal comprises:

detecting, by the terminal, the signal according to a connection mode;

in condition that the terminal is in a first connection mode, in response to determining that the signal is a third signal, detecting, by the terminal, the physical downlink channel; and in response to determining that the signal is a fourth signal, not detecting, by the terminal, the physical downlink channel; or in condition that the terminal is in a second connection mode, in response to determining that the signal is a fifth signal, detecting, by the terminal, the physical downlink channel; and in response to determining that the signal is a sixth signal, not detecting, by the terminal, the physical downlink channel;

wherein in condition that the terminal is in the first connection mode, determining a cyclic shift index of the ZC sequence comprised in the third signal according to a cyclic shift index 3 corresponding to the third signal, and determining a cyclic shift index of the ZC sequence comprised in the fourth signal according to a cyclic shift index 4 corresponding to the fourth signal;

in condition that the terminal is in the second connection mode, determining a cyclic shift index of the ZC sequence comprised in the fifth signal according to a cyclic shift index 5 corresponding to the fifth signal, and determining a cyclic shift index of the ZC sequence comprised in the sixth signal according to a cyclic shift index 6 corresponding to the sixth signal; and wherein the cyclic shift index 3, the cyclic shift index 4, the cyclic shift index 5 and the cyclic shift index 6 are pre-determined values, or satisfy that each two of the cyclic shift index 3, the cyclic shift index 4, the cyclic shift index 5 and the cyclic shift index 6 have a maximum cyclic shift spacing between the each two of the cyclic shift index 3, the cyclic shift index 4, the cyclic shift index 5 and the cyclic shift index 6.

12. The method of claim 9, wherein the detecting, by the terminal, the signal, and determining whether to detect the physical downlink channel according to the detection result for the signal comprises:

detecting, by the terminal, the signal according to a connection mode;

in condition that the terminal is in a first connection mode, detecting, by the terminal, the physical downlink channel only when the signal is detected to be a seventh signal; or in condition that the terminal is in a second connection mode, detecting, by the terminal, the physical downlink channel only when the signal is detected to be an eighth signal;

wherein in condition that the terminal is in the first connection mode, determining a cyclic shift index of the ZC sequence comprised in the seventh signal according to a cyclic shift index 7 corresponding to the seventh signal;

in condition that the terminal is in the second connection mode, determining a cyclic shift index of the ZC sequence comprised in the eighth signal according to a cyclic shift index 8 corresponding to the eighth signal; and wherein the cyclic shift index 7 and the cyclic shift index 8 are pre-determined values, or are cyclic shift indexes having a maximum cyclic shift spacing between the cyclic shift indexes.

13. A signal transmission method, comprising:

sending, by a base station, a signal at a preset first time-frequency position; and determining, by the base station, whether to send a physical downlink channel according to the signal, wherein the first time-frequency position comprises: a subframe where the signal is located comprised in a time domain position of the first time-frequency position;

wherein the subframe where the signal is located is determined according to at least one of: a starting position of a physical downlink control channel (PDCCH) search space, a discontinuous reception (DRX) starting position or an extended DRX (eDRX) starting position, or a number of repetitions of the signal;

wherein the number of repetitions of the signal is configured via high-layer signaling.

14. The method of claim 13, wherein the determining, by the base station, whether to send the physical downlink channel according to the signal comprises:

in condition that the signal is a first signal, sending, by the base station, a physical downlink channel corresponding to the signal;

in condition that the signal is a second signal, not sending, by the base station, a physical downlink channel corresponding to the signal.

15. The method of claim 13, wherein sending, by the base station, the signal at the preset first time-frequency position comprises:

sending, by the base station, the signal according to a connection mode of a terminal;

wherein in condition that the terminal is in a first connection mode, in response to the signal sent by the base station being a third signal, sending, by the base station, the corresponding physical downlink channel; and in response to the signal sent by the base station being a fourth signal, not sending, by the base station, the physical downlink channel; or in condition that the terminal is in a second connection mode, in response to the signal sent by the base station being a fifth signal, sending, by the base station, the corresponding physical downlink channel; and in response to the signal sent by the base station being a sixth signal, not sending, by the base station, the physical downlink channel.

16. The method of claim 13, wherein the sending, by the base station, the signal at the preset first time-frequency position comprises:

sending, by the base station, the signal according to the connection mode of the terminal;

in condition that the terminal is in a first connection mode, sending, by the base station, the corresponding physical downlink channel only when the signal sent by the base station is a seventh signal; or in condition that the terminal is in a second connection mode, sending, by the base station, the corresponding physical downlink channel only when the signal sent by the base station is an eighth signal.

17. A signal transmission apparatus, comprising a processing circuitry and a storage device, wherein the storage device stores processor-executable programs, and the processing circuitry comprise:
- a receiving module, which is configured to receive, at a preset first time-frequency position,
- a signal sent by a base station; and
- a detecting module, which is configured to detect the signal, and determine whether to detect
- a physical downlink channel according to a detection result for the signal,
- wherein the first time-frequency position comprises: a subframe where the signal is located comprised in a time domain position of the first time-frequency position;
- wherein the subframe where the signal is located is determined according to at least one of: a starting position of a physical downlink control channel (PDCCH) search space, a discontinuous reception (DRX) starting position or an extended DRX (eDRX) starting position, or a number of repetitions of the signal;
- wherein the number of repetitions of the signal is configured via high-layer signaling.

* * * * *